United States Patent

[11] 3,602,979

[72] Inventor Felix P. La Iacona
 Huntsville, Ala.
[21] Appl. No. 6,610
[22] Filed Jan. 28, 1970
[45] Patented Sept. 7, 1971
[73] Assignee The United States of America as represented by the Administrator of the National Aeronautics and Space Administration

[54] BONDING OF REINFORCED TEFLON TO METALS
 12 Claims, 4 Drawing Figs.
[52] U.S. Cl. .................................................. 29/473.1,
 29/472.9
[51] Int. Cl. ...................................................... B23k 31/02
[50] Field of Search .......................................... 29/472.9,
 473.1; 113/120 A, 120 CC

[56] References Cited
UNITED STATES PATENTS
| | | | |
|---|---|---|---|
| 2,523,155 | 9/1950 | Shoupp ......................... | 29/473.1 X |
| 2,800,710 | 7/1957 | Dunn............................. | 29/473.1 |
| 2,996,401 | 8/1961 | Welch et al. .................. | 29/473.1 X |

Primary Examiner—John F. Campbell
Assistant Examiner—Richard Bernard Lazarus
Attorneys—L. D. Wofford, Jr., J. H. Beumer and G. T. McCoy ABSTRACT: Reinforced FEP Teflon composite material is bonded to a metal substrate by applying a thin layer of copper on the metal surface, disposing irregularly shaped copper particles on the coated surface, assembling the reinforced Teflon in contact with the particles and heating the assembly under pressure at an elevated temperature below the melting point of the Teflon. A diffusion bond stronger than the reinforced Teflon component is produced, thus enabling the fabrication of self-lubricating bodies having relatively high strength.

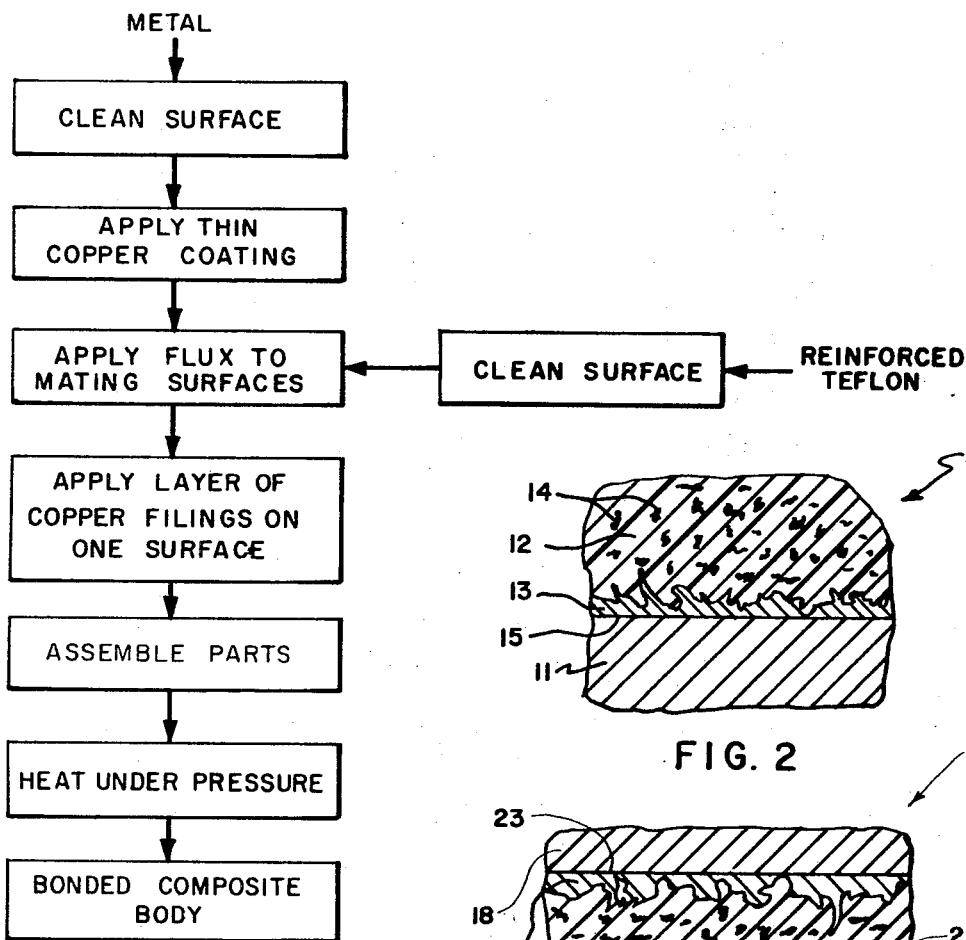

BONDING OF REINFORCED TEFLON TO METALS

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to joining of fluorocarbon polymers to metals and more particularly to bonding reinforced FEP Teflon to metals.

Fluorocarbon polymers exemplified by polytetrafluoroethylene and fluorinated ethylene propylene are useful for many applications which involve joining of the polymer to a metal substrate. These polymers are commonly known by the trade name Teflon, and are further designated as "TFE Teflon" and "FEP Teflon," respectively. Teflon polymers exhibit near ideal properties for use as a lubricating coating or component of a self-lubricating composite body: an extremely low coefficient of friction, a high degree of chemical inertness and good thermal stability. However, such properties contribute to the difficulty of forming a strong bond with metals.

A strong bond between a metal and Teflon or a Teflon-base reinforced material is especially required for composite self-lubricating gears and journals made up of alternating layers of metal and reinforced Teflon. Composite bodies of this type having the alternating layers disposed diagonally to provide for continuous distribution of lubricant at contacting surfaces are disclosed in copending application Ser. No. 827,579, filed May 27, 1969 by Keith E. Demorest and assigned to a common assignee. The Teflon-base layers for the composite bodies disclosed therein are made up of a major portion of Teflon and a minor portion of a reinforcing material such as bronze powder or glass fibers. Self-lubricating gears and journals of this type are useful for applications requiring long term service in the space environment where conventional lubricants rapidly become degraded.

Gear bodies having alternating layers of steel and reinforced Teflon have been formed previously by adhesive bonding of the assembled layers. The strength of the resulting bonds is relatively low, however, and the gear bodies tend to undergo delamination during machining of teeth. In addition, a prolonged curing cycle is required, and the temperature capability of the adhesively bonded body extends only to about 250° F. Furthermore, most adhesives fail to meet special requirements imposed for use in the space environment, that is, radiation stability and freedom from outgassing in vacuum. An effective method for producing a high-strength bond between metal and reinforced Teflon would enable the use of such composite bodies for many purposes in the terrestrial environment as well as in space.

SUMMARY OF THE INVENTION

In the present invention Teflon or reinforced material containing a major portion of Teflon is bonded to a metal substrate by depositing a thin, continuous coating of copper on the metal surface, disposing a layer of irregularly shaped copper particles in contact with the copper coating, assembling the Teflon-containing component in contact with the particle layer, and heating the assembly under pressure at an elevated temperature below the melting point of the Teflon. In the case of FEP Teflon a high-strength bond is rapidly formed by this method, the bond being stronger than the reinforced Teflon component. The resulting bond is stable under vacuum and radiation, and it maintains its strength at temperatures up to about 600° F. Self-lubricating gear wheels, journals and other parts formed by this method can thus be used under the adverse conditions existing in the space environment as well as under less rigorous conditions. TFE Teflon can also be bonded to metals by this method, but the strength and temperature capability of the bond are appreciably lower than for FEP Teflon.

It is therefore an object of this invention to provide a method of joining Teflon to metals.

Another object is to provide a method of bonding reinforced Teflon to metals.

Still another object is to provide a method of bonding FEP Teflon-bronze powder composite material to steel.

Another object is to provide a method of fabricating laminated self-lubricating bodies having alternating layers of steel and reinforced FEP Teflon.

Yet another object is to provide a high-strength bond between reinforced FEP Teflon and steel that is stable under vacuum, radiation and elevated temperatures.

Other objects and advantages of the invention will be apparent from the following detailed description and the appended claims.

BRIEF DESCRIPTION OF THE DRAWINGS

FIG. 1 is a flowsheet illustrating the bonding method of the present invention;

FIG. 2 is an enlarged, fragmentary sectional view of an article bonded by the method of this invention;

FIG. 3 is an enlarged, fragmentary sectional view of a laminated article in which a reinforced FEP Teflon sheet is bonded on both sides to steel; and FIG. 4 is an elevational view of a self-lubricating spur gear wheel in which alternating layers of steel and reinforced FEP Teflon are bonded together.

DESCRIPTION OF THE PREFERRED EMBODIMENT

Referring to FIG. 1 of the drawing, the method of bonding reinforced FEP Teflon to metal is illustrated by a flow diagram. The component metal and reinforced FEP Teflon parts are first cleaned to remove any surface contamination at the mating surfaces. Solvents such as methyl alcohol, trichloroethylene or acetone can be used for this purpose.

A thin, continuous coating of copper is then deposited on the joining surface of the metal part. The copper coating is critical to the attainment of a strong bond, especially between steel and reinforced FEP Teflon. It is believed that the copper therein serves to promote diffusion during the subsequent heating step. A continuous coating of minimum thickness is preferred, and such coating can be applied by electrolytic flash or strike techniques in which copper is deposited by placing the part in a copper cyanide bath for approximately 1 minute. The coating is obtained by this means has a thickness of about 1 to 5 millionths of an inch. Thicker coatings provide no advantage and may result in a weaker bond. Copper can be electrolytically deposited directly on most metals; however, in some cases a preliminary treatment may be needed to obtain good adhesion. For example, for aluminum alloys it is preferred to use a zincate treatment in which zinc is deposited on the part prior to the copper strike to promote adhesion of the copper coating.

Although, not critical, it is preferred to apply a thin coating of a liquid flux to the mating surfaces prior to placement of the layer of copper particles. The flux does not directly enter into the formation of a bond, but it serves to keep the copper coating deoxidized and clean, and it holds the particles in position during assembly of the mating parts. Fluxes of the type commonly used for aluminum alloys are suitable for this purpose, such fluxes being exemplified by the composition available from the Hester Solder Company under the trade name "Hester Flux No. 1544," which was used in fabricating gear wheels by the method of this invention. Other metal or alloy fluxes which provide a sticky or tacky surface for adhesion of the copper particles can also be used.

Bonding is obtained by heating the assembled parts under pressure to an elevated temperature. For FEP Teflon, or reinforced composite material based on FEP Teflon, a temperature of 550° F. to 580° F. is preferred. At lower temperatures bonding proceeds slowly, and higher temperatures may result in plastic flow of the Teflon and distortion of the joint area. For TFE Teflon a temperature of 300° F. to 375° F. is preferred. In any event, the temperature must be kept below the melting point for the particular Teflon used, 625° F. to 700° F. FEP Teflon and 400° F. to 550° F. for TFE Teflon. A pressure of 2,350 to 2,650 pounds per square inch is preferred for FEP Teflon, and best results are obtained at a pressure of about 2,500 p.s.i. Pressures below 2,350 p.s.i. may result in incomplete bonding pressures over 2,650 p.s.i. may have the same adverse effect as excessive temperatures. For TFE Teflon a pressure of 1,000 to 1,500 p.s.i. is preferred. Complete bonding is produced by holding the assembly at the preferred temperature and pressure for a period of about 25 to 365 minutes, although longer periods can be used. The assembly is then allowed to cool, and the bonded composite article is removed from the press.

FIG. 2 shows a fragmentary section of article 10 prepared by bonding a steel member 11 to a reinforced FEP Teflon member 12 by the method of this invention. The layer of copper filings 13 is thoroughly interlocked into the matrix of the Teflon member 12. Reinforcing material in the Teflon member is also shown in this view as particles 14 of bronze powder. The thin coating of copper applied to the metal part before bonding, is scarcely visible at the metal-copper particle interface 15 after bonding, having largely diffused into the copper particles and adjacent metal during the heating step. Articles having the structure shown in FIG. 2 are useful as sliding contacts or for similar purposes.

FIG. 3 shows a fragmentary section of a laminated article 16 wherein a layer of reinforced FEP Teflon 17 is bonded between layers 18 and 19 of steel. Layers of copper filings 20 and 21 are shown interlocked with the top and bottom surfaces of the reinforced Teflon. Reinforcing bronze particles 22 are shown within the Teflon matrix, and upper and lower copper coatings are diffused at the interfaces 23, 24 between copper particle layers and steel. The bonded structure shown in this Figure is useful for high-strength self-lubricating articles such as gears and journals. Self-lubricating parts should be fabricated from this structure in a manner such that an exposed edge of a reinforced Teflon layer extends diagonally across the surface which makes frictional contact with other parts.

FIG. 4 shows a laminated, self-lubricated spur gear wheel bonded together by the method of this invention. The gear wheel 25 includes outer wedge-shaped steel portions 26, 27 and two reinforced Teflon layers 28, 29 bonded thereto and having a layer 30 of steel sandwiched between the reinforced Teflon layers. At each interface the reinforced Teflon and steel components have been bonded together by means of a copper coating and copper particle layer (not visible in this view) and by the application of heat and pressure as described above.

The method of this invention is broadly applicable to bonding of metals to Teflon and Teflon-base materials. In particular, metals such as steels and other ferrous metal alloys, aluminum alloys, copper alloys and nickel alloys are included. For gear wheels intended to bear heavy loads the metal portions will usually be made of a high-strength steel hardened to a relatively high hardness value. As indicated above, some metals may require a preliminary surface treatment to enable adhesion of the thin copper coating.

The Teflon-containing component bonded as described above can be made of TFE or FEP Teflon alone. However, for applications where maximum strength is desired in the bonded article, for example, in gear wheels designed to bear substantial loads, FEP Teflon reinforced by inclusion of metal particles or fibrous material such as fiberglass is preferred. The reinforced FEP Teflon will normally contain at least 50 weight percent FEP Teflon and a lesser portion, for example, 5 to 40 weight percent, reinforcing particles or fibers dispersed therein in a manner such that the matrix material of the composite FEP is Teflon. Reinforced FEP Teflon composites can be prepared by mixing finely divided FEP Teflon with the reinforcing material and heating the mixture under pressure. An example of suitable reinforced Teflon for use in gear wheels is the FEP Teflon-bronze composite sheet material available commercially under the trade name "Salox M." This material contains 15 to 25 weight percent bronze particles dispersed in FEP Teflon, the mixture being formed into a sheet by application of heat and pressure.

Laminated bodies bonded by the method of this invention exhibit much higher strength than similar bodies prepared by adhesive bonding. Bodies having the structure shown in FIG. 3, made up of 4,340 steel heat-treated to a hardness valve of $R_c$ 39–41 and "Salox M" FEP Teflon-bronze powder sheet material one-sixteenth inch thick, were sheared within the reinforced FEP Teflon when subject to severe impact tests. The bonds between the steel and reinforced FEP Teflon remained intact.

It is to be understood that the embodiments described above and depicted in the drawing are merely illustrative and that various changes and modifications may be made without departing from the spirit and scope of the invention.

I claim:

1. The method of bonding a metal member to a Teflon-base material member which comprises applying a thin, continuous coating of copper to the metal member so as to cover the intended mating surface thereof, disposing a substantially continuous layer of irregularly shaped copper particles in contact with said coating and in contact with the mating surface of said Teflon-base member and compressing said members together while heating the resulting assembly to an elevated temperature below the melting point of the Teflon.

2. The method of claim 1 wherein said Teflon-base material is reinforced FEP Teflon.

3. The method of claim 2 wherein said assembly is heated to a temperature of 550° F. to 580° F.

4. The method of claim 3 wherein said members are compressed together at a pressure of 2,350 to 2,650 p.s.i.

5. The method of claim 4 wherein said assembly is held at said temperature for a period of at least 25 minutes.

6. The method of claim 2 wherein said copper particles are copper filings having a particle size of −120, +200 mesh.

7. The method of claim 6 wherein said copper coating is applied by means of an electrolytic flash or strike step.

8. The method of claim 7 wherein a liquid flux is applied to said copper coating prior to disposing said copper particles in contact therewith.

9. The method of claim 2 wherein said metal is steel.

10. The method of claim 2 wherein said reinforced FEP Teflon consists of a dispersion of bronze particles in FEP Teflon, said dispersion having been prepared by mixing finely divided FEP Teflon and bronze and heating the resulting mixture under pressure.

11. The method of claim 1 wherein said Teflon-base material is TFE Teflon.

12. The method claim 11 wherein said assembly is heated to a temperature of 300° F. to 375° F. and said members are compressed together at a pressure of 1,000 to 1,500 p.s.i.